United States Patent [19]

Morgan

[11] Patent Number: 4,565,074
[45] Date of Patent: Jan. 21, 1986

[54] ICE TRAY FOR USE WITH A PORTABLE ICE CHEST

[76] Inventor: Marshall M. Morgan, 8210 Brae Acres, Houston, Tex. 77074

[21] Appl. No.: 557,487

[22] Filed: Dec. 2, 1983

Related U.S. Application Data

[63] Continuation-in-part of Ser. No. 340,100, Jan. 18, 1982, Pat. No. 4,424,687.

[51] Int. Cl.[4] .............................................. F25D 3/08
[52] U.S. Cl. ...................................... 62/457; 62/372; 62/459; 62/463; 62/464; 220/409; 108/901
[58] Field of Search ................. 62/457, 458, 459, 371, 62/372, 529, 530, 463, 464, 465; 220/409, 412; 108/901, 51.1; 206/386

[56] References Cited

U.S. PATENT DOCUMENTS

| | | | |
|---|---|---|---|
| 416,356 | 12/1889 | Clark | 62/459 X |
| 438,391 | 10/1890 | Stone | 62/372 X |
| 594,413 | 11/1897 | Medberry et al. | 62/464 X |
| 1,074,453 | 9/1913 | Park | 62/457 X |
| 1,186,418 | 6/1916 | Mischo | 62/457 |
| 1,745,556 | 2/1930 | Pendleton | 62/463 X |
| 1,782,720 | 11/1930 | Franklin | 62/459 X |
| 2,104,685 | 1/1938 | Wilson, Jr. | 62/459 X |
| 2,302,639 | 11/1942 | Moore | 62/459 X |
| 3,359,756 | 12/1967 | Mirquet | 62/457 |
| 3,628,468 | 12/1971 | Angelbeck, Jr. | 108/901 X |
| 3,636,888 | 1/1972 | Angelbeck, Jr. | 108/901 X |
| 3,707,929 | 1/1973 | Lauffer | 108/901 X |
| 4,265,095 | 5/1981 | McConachie | 62/457 X |

FOREIGN PATENT DOCUMENTS 1124666  8/1968  United Kingdom ............... 220/409

Primary Examiner—Lloyd L. King
Attorney, Agent, or Firm—Gunn, Lee & Jackson

[57] ABSTRACT

In the preferred and illustrated embodiments of the present apparatus, a tray or platform standing above the bottom of an ice chest is disclosed. The tray is a generally horizontal planar member having a number of slots or openings formed therein, and further comprising a set of feet which support the horizontal member in an elevated position. In an alternate embodiment, the tray rests on a set of raised transverse members integrally formed in the bottom of the ice chest.

3 Claims, 10 Drawing Figures

ICE TRAY FOR USE WITH A PORTABLE ICE CHEST

RELATED APPLICATIONS

This application is a continuation-in-part application of Ser. No. 340,100 filed Jan. 18, 1982, now U.S. Pat. No. 4,424687.

BACKGROUND OF THE DISCLOSURE

This disclosure is directed to an apparatus which can be inserted or removed from an ice chest. It is particularly useful with a portable ice chest incorporating raised transverse members along the bottom thereof for supporting a rack or tray.

A portable ice chest is normally chilled by placing crushed ice in the chest. As the ice melts, it accumulates water on the bottom. The water has a tendency to soak certain stored items. In the instance of canned beverages in glass or metal containers, this poses no particular problem. By contrast, this is a more significant problem in the instance of storing paper wrapped products which wrapping might not fully exclude the water. This would apply to sandwiches and bread. This would also apply to various and sundry pastries. In large part, soaking depends on the integrity of the wrapping; it is not likely that the wrapping will stay completely dry on the interior for extended periods. The tendency to soak the wrapping and hence the product protected by the wrapping is cumulative. It is also aggravated because the ice melts and accumulates water in the bottom of the portable ice chest.

Trays or platform to be positioned in the bottom of an ice chest have been devised heretofore. One such tray is described in U.S. Pat. No. 2,663,157 of Laramy. This shows a tray which is hinged so that the hinged portion can be swung aside. U.S. Pat. No. 4,255,944 of Gardner discloses leg supports. There are a number of limitations in devices of this sort. The present apparatus does not include a hinge with moving parts which are susceptible of rust or freezing as a result of rust. The present apparatus tolerates water without damage. One of the deficiencies of the Laramy apparatus is the pivot without a fixed angular position and the required moving parts. The apparatus of this disclosure is summarized as a large planar surface elevated above the bottom of the ice chest and including a number of perforations therein to drain the ice placed on the tray.

In a simplified alternate embodiment, the apparatus includes a large planar surface supported on a set of raised transverse members along the bottom of the ice chest.

Food products placed in the ice chest of the invention may be kept above the water resulting from melting ice. The food protection avoids smell and contamination as typically occurs on storing recently caught fish prior to cleaning. The ice water picks up the slime or protective coating found on most fish species. It is usually undesirable to get this slime on the food or food packages. The ice is supported above the water in the bottom of the ice chest isolated or surrounded by cold, non-circulating air. The ice is therefore separated from the water in the bottom of the ice chest by a dead air space. This arrangement is particularly advantageous because air is an insulator and does not readily transfer heat to the ice on the tray. Therefore the ice lasts longer, keeping the food products fresh for a longer period of time.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not be considered limiting of its scope, for the invention may admit to other equally effective embodiments.

DETAILED DESCRIPTION OF THE PREFERRED EMBODIMENT

Figure 1:
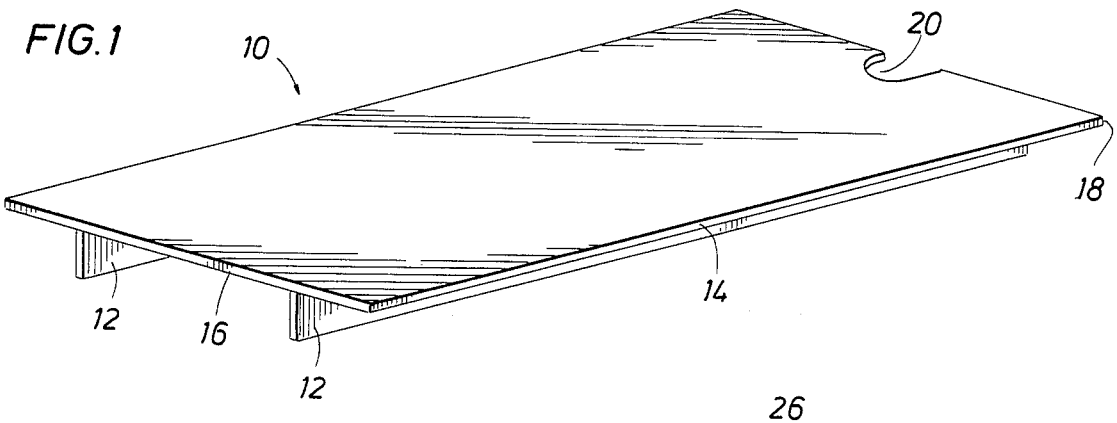
FIG. 1 is a perspective view of a tray adapted to be inserted in a portable ice chest in accordance with the teachings of the present invention which tray includes a plurality of legs supporting a tray of generally rectangular configuration.

Attention is first directed to FIG. 1 of the drawings where a tray 10 is illustrated in perspective. The tray 10 is constructed with a number of parallel, downwardly extending, legs 12. In the embodiment shown, there are two and they are arranged along the longitudinal length of the tray 10. The preferred embodiment incorprates two; the number can be varied depending on the weight and expanse of the apparatus. It also depends on the weight of materials to be placed on the tray. The legs 12 are of modest weight, typically being in the range of about two to nine centimeters, and are sufficiently spaced below the tray 10 so that the tray 10 does not easily tilt to one side or the other when items are placed on it.

The tray of FIG. 1 includes a large transverse sheet plastic member. It is formed with a generally rectangular shape having a long side 14 and a relatively short side 16 to fit within a particular size of ice chest. They define a rectangle. At the corners, the sides 14 and 16 join at corners 18. The sides 14 and 16 are spaced slightly from the walls forming the ice chest defining a peripheral gap therebetween. Thus water from the melting ice spills over the sides 14 and 16 to the bottom of the ice chest.

The rectangular profile is defined by four edges, there being two short sides and two longer sides. One of the short sides is notched at 20. The notch 20 serves as a convenient hand hold to grab the apparatus and to lift it from the ice chest. The notch 20 is cut at one edge. It can be conveniently at the opposite end as desired. Ordinarily, one is sufficient.

The tray 10 is described as a planar member of rectangular shape. It is best formed of sheet plastic material having a finite thickness typically in the range of about 3/16 inch. Typically, a clear or translucent plastic can be used. In the alternative, the plastic can be opaque or at least partially so. The plastic that is used is typically one which can withstand colder temperatures without becoming brittle. Metal, glass and plywood are also suitable materials from which the tray 10 may be fabricated.

The alternate embodiment of FIGS. 4–7 shows the apparatus made of relatively thin plastic stock. It is formed into a large sheet. The sheet is preferably rectangular as recited before. However, there are a number of holes or slots formed in the sheet, one such being identified by the numeral 39. The slot 39 is duplicated at many locations. This enables any ice which happens to be on the top of the tray to melt and the water from melting will drip through the tray. This enables the ice and the water from the melting ice to accumulate in the bottom of the ice chest which can then be drained from the typical chest sold in sporting good stores. Moreover, it enables cooling of the food stuffs supported on the tray. It is, therefore, generally desirable that the tray be perforated at many locations.

Figure 2:
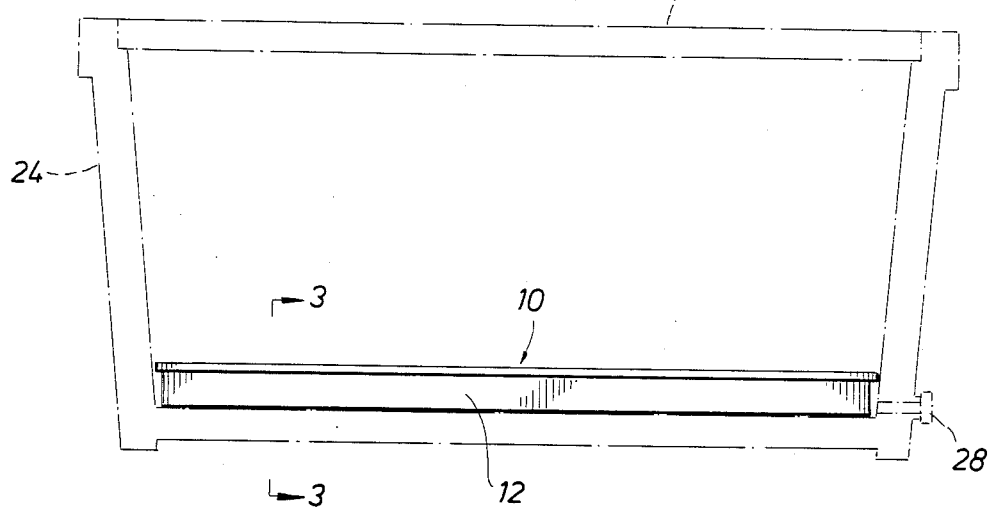
FIG. 2 of the drawings is a side view of the tray of FIG. 1 showing the tray placed within a portable ice chest to support food and other materials in the ice chest above the bottom thereof.
Figure 3:
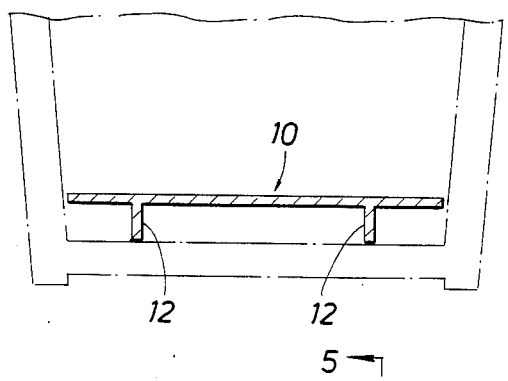
FIG. 3 is a sectional view along the line 3—3 disclosing the tray of the present invention in the ice chest.

In FIGS. 2 and 3, the tray 10 of the present apparatus is shown in an ice chest. The ice chest is generally identified by the numeral 24, and has a removable lid or cover 26. A drain spigot or tap 28 is usually included to drain ice water from the chest. This enables the ice chest to be recharged with fresh ice after draining and even while leaving the food in the chest. In fact, chilled game and fish may be left in the chest for several days because it is not soaking in the effluent.

Figure 5:
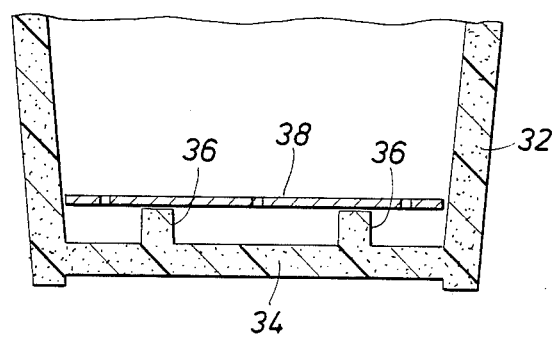
FIG. 5 is a sectional view of the tray and the portable ice chest taken along line 5—5 of FIG. 4.
Figure 4:
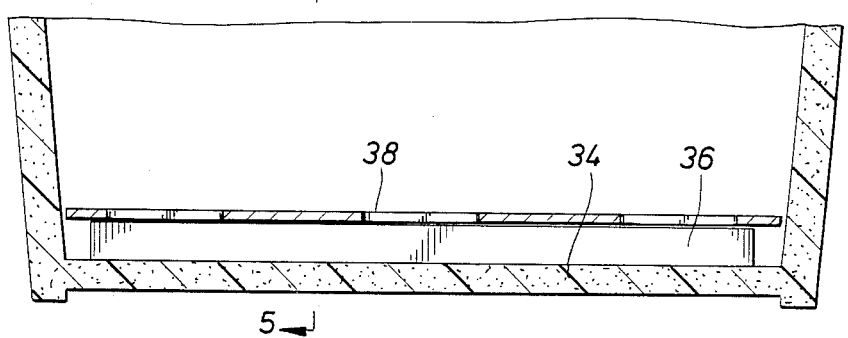
FIG. 4 is a sectional view of an alternate embodiment of the tray and the portable ice chest of the present invention, which portable ice chest includes a plurality of raised, integral transverse support members for supporting the tray above the bottom of the ice chest.
Figure 6:
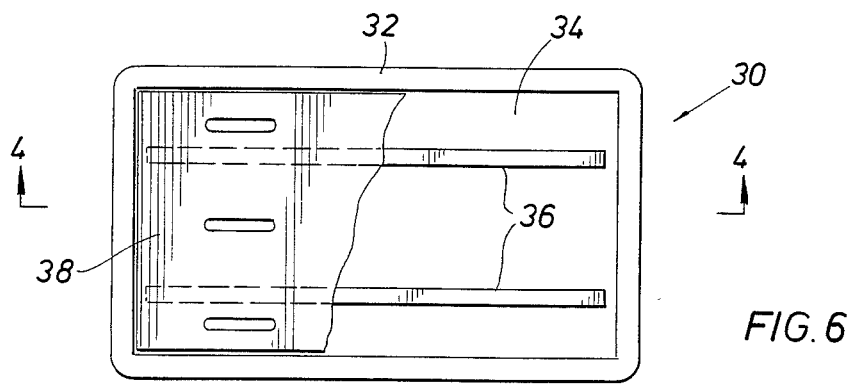
FIG. 6 is a top plan view of the interior of the portable ice chest shown in FIG. 4 of the present invention.

Attention is next directed to FIGS. 4 and 5 of the drawings where a ice chest 30 is illustrated in section. The ice chest 30 is constructed with a number of parallel walls 32 extending upwardly from a bottom 34. In the embodiment shown, there are four walls arranged in a conventional manner. The ice chest 30 looks like a conventional ice chest in all respects from the exterior, i.e. it has four walls, a bottom, and a top or cover and may be provided with a drain if desired. The interior of the ice chest 30 however incorporates a set of raised, transverse members 36 as best shown in FIGS. 4 and 5. It will be observed that the bottom 34 of the ice chest 30 is a generally planar surface and rectangular in shape. The walls 32 extend upwardly from the bottom 34 a suitable height, usually 12–14 inches. A drain (not shown on the drawings) may be incorporated adjacent the bottom 34 of the ice chest 30 to enable draining of accumulated water in the bottom of the ice chest.

A set of raised, transverse members or legs 36 are integrally formed with the bottom 34 of the ice chest 30. The legs 36 extend across the full width of the ice chest 30 and rise approximately 1-2 inches above the bottom 34. The legs 36 are preferably about one inch in width and have sufficient strength and rigidity to support a tray 38, ice and food products placed thereon. The height and width of the transverse legs 36 may vary somewhat; it being important only that they support the weight of the maximum capacity of food stuff which may be placed in the ice chest 30, generally 5-10 pounds. Furthermore, the legs 36 may be integrally fabricated with the bottom of the ice chest 30, yet the ends thereof are spaced from the side walls 32 defining a small passage between the ends of the legs 36 and the side walls 32. This is advantageous in that water which has accumulated in the bottom of the ice chest 30 may be conveniently drained through a drain port located at either end of the ice chest.

Figure 7:
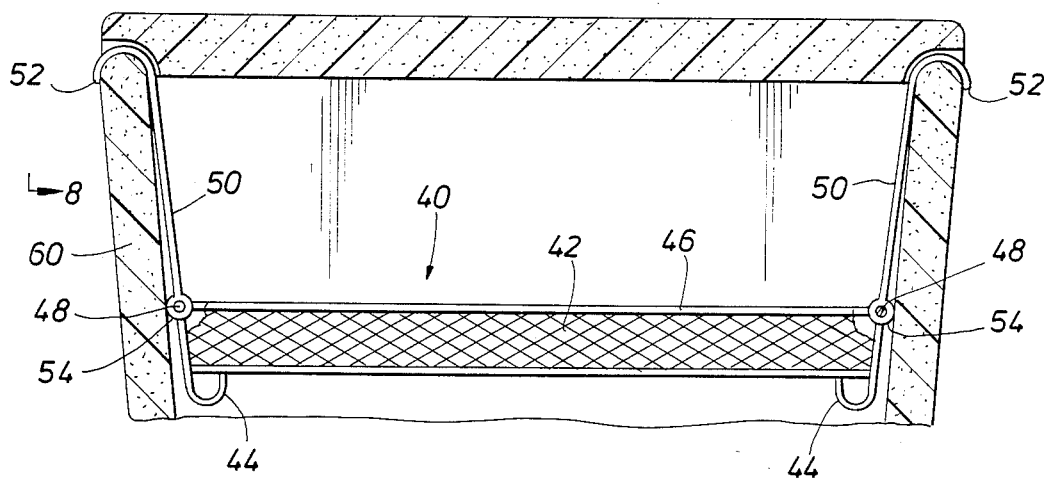
FIG. 7 discloses an alternate form of food support apparatus in an ice chest disclosing a means for elevating the food on a platform.

Attention is next directed to FIG. 7 of the drawings. This use sets forth a modified food support basket 40 shown in side view. It is a generally rectangular basket having a bottom and four surrounding upright walls 42. They are formed of expanded wire mesh; an alternate form is to utilize perforated plastic sheet stock. In both cases, the material is preferably rustproof and does not corrode. It is important to avoid this kind of damage in light of exposure to the water that inevitably collects in the ice chest.

The basket 40 in the preferred form in constructed with fairly large gauge wire at the edges and corners. The heavier wire is formed into four legs 44 located at the corners and extends equally therebelow to support the basket on a surface, typically on the bottom of the ice chest. In like fashion, the upstanding side walls are supported by a lengthwise reinforcing edge wires 46 around the top periphery. The two edge wires 46 are parallel to one another and extend the length of the basket. The rectangle is completed by means of similar top located edge wires 48. The four edge wires define a rectangle above the bottom.

The basket 40 as shown in FIG. 7 can support itself on the bottom. An alternate mode of installation in the ice chest is to hang it in the ice chest above the bottom. This can be accomplished by using upstanding hangers 50. Duplicate hangers are used at each end. Each hanger includes two generally parallel elongate arms. They extend upwardly and hook over the top lip of the ice chest, having a J-shaped hook. The J-shaped hook is shown in FIG. 7, lodged over the top lip of the open ice chest. The J-shaped hook is formed on both arms and the two are joined together by a transverse bar 52 better shown in FIG. 8. This unifies the hangers at each end; in other words, each end has a duplicate hanger and each hanger is formed of two arms so that the basket can be held in a horizontal position within the ice chest.

Figure 8:
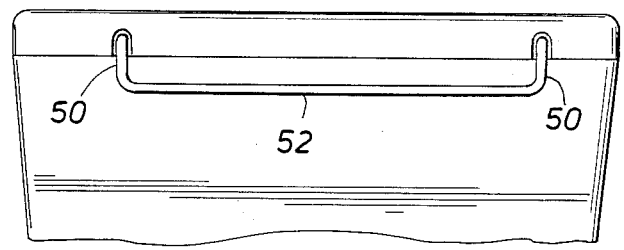
FIG. 8 is a detailed view of the hanger support mechanism shown in FIG. 7 illustrating details of construction.

FIGS. 7 and 8 jointly show small notches cut in the top for the ice chest 60. The notches are relatively small as better shown in FIG. 8. These notches serve as receptacles for the hanger just described. In particular, they are included to enable the hanger to suspend the basket 40 within the ice chest above the water in the bottom of the ice chest. This is accomplished without letting the cold air in the ice chest escape. The cold air is prevented from escaping by forming very small notches, somewhat in the form of semi-circular notches in the lid to enable the lid to nest into the ice chest and to prevent thermal leakage.

The hanger at each end is thus formed of a pair of parallel downwardly extending arms which terminate in circling hooks 54. The hooks 54 engage the transverse wires 48 which define the framework of the basket 42. A complete circle is permissible so that the hooks are permanently attached. This avoid misplacing the hooks. Alternately, the hooks can be formed into partial circles so that they have a slot whereby the hooks can be selectively engaged or disengaged.

Figure 9:
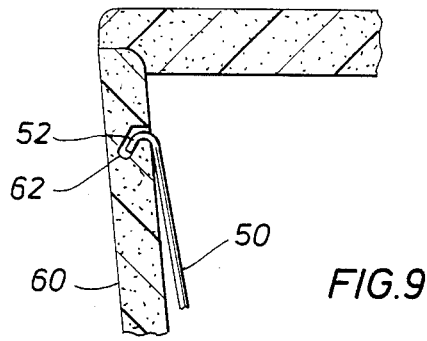
FIG. 9 shows an alternate form of hanger support contrasted to the form shown in FIG. 8.
Figure 10:
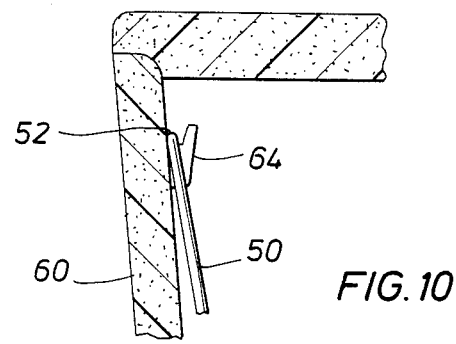
FIG. 10 discloses even another form of hanger support contrasting with those shown in FIGS. 7 and 9.

The hook arrangement shown in FIGS. 7 and 8 is more than satisfactory. An alternate approach, however, is shown in FIG. 9. The J-shaped hanger is bent to a slightly different radius of curvature and is positioned within a notch 62 cut in the wall of the ice chest 60. The notch or slot 62 is cut across the face of the end wall of the ie chest. For instance, the bar 52 might be six inches long. The notch shown in FIG. 9 should be at least six inches in length to accommodate the bar 52. The hanger is then fully enclosed within the ice chest and there is no need to modify the lip joining the lid to the ice chest. By contrast, another form is shown in FIG. 10, and this utilizes a wall mounted hook 64 on the interior of the ice chest. Again, if the hanger 52 is six inches in length, it is preferable to use two or three hooks covering a span of slightly less than six inches on the interior of the ice chest. The depth which is required is a scale factor and can be varied. It serves as a wall mounted hook to receive the hanger. In this instance, it is not necessary to bend the hanger into a J-shaped hook. Rather, hooking is accomplished by the transverse bar 52 which comprises a portion of the hanger structure.

BENEFITS TO HUNTERS AND FISHERMEN

This apparatus is particularly beneficial to those who hunt or fish. Assume that some game has been taken or fish has been caught. The example is all the more common with fish. Freshly taken game or fish has a high quality which rapidly deteriorates dependent on field conditions. This is accelerated by soaking the fish in the blood and natural fish slime which inevitably accumulates in the bottom of most ice chests. This common approach used by sportsmen does provide the cooling, but it also aggravates the problem by accumulating the slime in close and intimate contact with the game or fish. This is true where the fish has not been cleaned. It is somewhat reduced where the fish has been cleaned and only filets are stored.

The apparatus disclosed herein is quite valuable because it permits an improved procedure for storage of the fish and game. Briefly, a layer of ice is placed on the platform described in this disclosure and the game or fish is layed over the layer of ice. Assume that this is several freshly caught and cleaned fish. If another layer of ice is poured over the stored fish, the fish is reduced in temperature. An important factor is the relatively slow and continual trickling of water from the melting ice over the stored fish. In a fashion, this washes the fish while maintaining a very high humidity. This reduces water logging and deterioration as a result of the decay which occurs with such game or fish. The water which is accumulated in the bottom of the ice chest is below the game or fish and does not wash the slime, blood and other water soluable constituents over the game or fish. It is particularly improved if the ice chest is drained once or twice daily. Such draining has the advantage of carrying away the accumulated ice melt and the water soluable products which are in water. This extends the cooler life of the game of fish. Typically, actual decay is retarded, and even delayed for several days. It maintains the game or fish in a state where it is almost but not quite frozen and is exposed to high humidity. In fact, this procedure can be used with certain live fish, as an easy example, crabs. It appears that they are able to come back to life, the chilling apparently anesthetizing the crabs. Whatever the case, it is ideal to maintain the game or fish in an environment where the temperature is about 32° F., perhaps with a margin of 3° or 4° in either direction. The margin is dependent on a number of factors.

While the foregoing is directed to the preferred embodiment of the present invention, other and further embodiments of the invention may be devised without departing from the basic concept thereof, and the scope thereof is determined by the claims which follow.

What is claimed is:

1. In combination:
    (a) a portable ice chest having a horizontally extending bottom, front and back side walls extending upwardly from the bottom, and end walls extending upwardly from the bottom between the front and back side walls, the front, back and end walls supporting a removable lid thereon and defining a generally rectangularly shaped portable ice chest, the ice chest receiving and holding a supply of ice for cooling; and
    (b) a single piece removable tray nested in place and received interiorly of the portable ice chest wherein said tray is surrounded by the ice chest walls, said tray comprising a generally rectangular planar surface including a pair of integrally formed lengthwise legs there beneath which support said planar surface at an elevated position within the portable ice chest, said legs being inwardly spaced from the lengthwise edges of said rectangular planar surface and extending parallel thereto, said legs being spaced from each other enabling said tray to support weight thereon without tilting, and said planar surface being spaced from the surrounding ice chest walls defining a gap therebetween permitting melting ice to spill over the edge of said planar surface to the bottom of the ice chest.

2. The apparatus of claim 1 wherein said planar surface is lengthwise slotted and includes a hand hold notch at one edge.

3. A portable ice chest having surrounding walls and a bottom wherein the ice chest is adapted to receive ice therein to chill fish or game supported on a single piece removable tray within the ice chest, support means for supporting said tray means above the bottom of the ice chest which support means comprises a set of lengthwise legs integrally formed with the bottom of the ice chest and extending upwardly therefrom for supporting said tray a desired elevation within the ice chest and above the bottom thereof, said legs being inwardly spaced from the longitudinal surrounding walls of the ice chest and extending parallel thereto between the end walls of the ice chest, said legs terminating a short distance from the end walls defining a passage therebetween for permitting fluid to flow to a drain opening located in the ice chest.

* * * * *